(12) United States Patent
Datta et al.

(10) Patent No.: US 11,928,665 B2
(45) Date of Patent: Mar. 12, 2024

(54) METHODS AND SYSTEMS FOR FACILITATING A PAYMENT TRANSACTION OVER A SECURE RADIO FREQUENCY CONNECTION

(71) Applicant: MASTERCARD INTERNATIONAL INCORPORATED, Purchase, NY (US)

(72) Inventors: Saugandh Datta, Greater Noida (IN); Awinash Pandey, Gurgaon (IN); Ankur Mehta, Faridabad (IN); Chandan Garg, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/380,724

(22) Filed: Jul. 20, 2021

(65) Prior Publication Data
US 2022/0027888 A1   Jan. 27, 2022

(30) Foreign Application Priority Data
Jul. 21, 2020   (IN) .............................. 202041031092

(51) Int. Cl.
    *G06Q 20/32*    (2012.01)
    *G06Q 20/20*    (2012.01)
    *G06Q 20/40*    (2012.01)
(52) U.S. Cl.
    CPC ......... *G06Q 20/3278* (2013.01); *G06Q 20/20* (2013.01); *G06Q 20/325* (2013.01); *G06Q 20/405* (2013.01)
(58) Field of Classification Search
    None
    See application file for complete search history.

(56) References Cited

U.S. PATENT DOCUMENTS

| 7,565,307 B1* | 7/2009 | Pinkus | G06Q 20/382 |
| | | | 705/16 |
| 9,230,272 B1* | 1/2016 | Eramian | H04W 4/33 |

(Continued)

FOREIGN PATENT DOCUMENTS

| CN | 104376460 A | 2/2015 |
| KR | 10-2007-0039380 A | 4/2007 |

(Continued)

OTHER PUBLICATIONS

Klaarbergen, Swen van; "Mobile Payment Transaction: BLE and/or NFC", White Paper, Apr. 1, 2014, pp. 1-9. (Year: 2014).*

(Continued)

*Primary Examiner* — Mohammad Z Shaikh
(74) *Attorney, Agent, or Firm* — Barta Jones, PLLC

(57) ABSTRACT

Embodiments provide methods, and systems for facilitating a payment transaction utilizing a pre-defined radio frequency allocated by an agency to a merchant. A user may open an application provided and maintained by a payment network on a user device and input the pre-defined radio frequency associated with the merchant. The payment network server is configured to establish a secure radio frequency connection between the user device and a merchant server of the merchant. Post establishment, the user may proceed to make a payment transaction to the merchant by choosing a payment method and authenticating his/her identity. The payment transaction is authorized by an issuer of the payment account and is forwarded to the payment network server. The payment network server is configured to fetch acquirer information of the merchant account and process the payment. Post completion, a confirmation message is sent to the user device over the secure RF connection.

20 Claims, 10 Drawing Sheets

(56) References Cited

U.S. PATENT DOCUMENTS

| | | | |
|---|---|---|---|
| 9,424,590 B2* | 8/2016 | Gerard | G06Q 30/0255 |
| 10,217,151 B1* | 2/2019 | Greiner | H04W 4/80 |
| 10,311,430 B2* | 6/2019 | Bennett | G06Q 40/02 |
| 10,311,438 B2* | 6/2019 | Lewis | G07G 1/14 |
| 10,430,782 B2* | 10/2019 | Lee | G06Q 20/3278 |
| 10,586,227 B2* | 3/2020 | Makhdumi | G06Q 20/3276 |
| 11,210,620 B2* | 12/2021 | Sakamoto | G06Q 30/0201 |
| 2004/0243588 A1* | 12/2004 | Tanner | G06F 16/2471 |
| 2006/0085848 A1 | 4/2006 | Aissi et al. | |
| 2008/0319905 A1* | 12/2008 | Carlson | G06Q 20/40 235/379 |
| 2009/0125406 A1* | 5/2009 | Lewis | G06Q 30/02 705/23 |
| 2009/0194583 A1* | 8/2009 | Chakiris | G06Q 20/354 235/382 |
| 2010/0082445 A1* | 4/2010 | Hodge | G06Q 20/20 705/35 |
| 2011/0106659 A1* | 5/2011 | Faith | G06Q 20/10 705/44 |
| 2012/0143703 A1* | 6/2012 | Wall | H04L 69/24 705/16 |
| 2012/0284193 A1* | 11/2012 | Bharghavan | H04L 9/3263 705/16 |
| 2013/0046643 A1* | 2/2013 | Wall | G06Q 20/3278 705/16 |
| 2013/0282502 A1* | 10/2013 | Jooste | G06Q 20/363 705/44 |
| 2014/0122340 A1* | 5/2014 | Flitcroft | G06Q 40/00 705/44 |
| 2014/0247709 A1* | 9/2014 | Carney | G06Q 20/40 370/395.5 |
| 2014/0344153 A1* | 11/2014 | Raj | G06Q 20/385 705/44 |
| 2015/0149254 A1* | 5/2015 | Sakamoto | G06Q 30/0201 705/7.34 |
| 2015/0287022 A1* | 10/2015 | Granbery | G06Q 20/227 705/44 |
| 2016/0019526 A1* | 1/2016 | Granbery | G01S 1/00 705/26.81 |
| 2016/0275492 A1* | 9/2016 | Brickell | G06Q 20/3674 |
| 2016/0292784 A1* | 10/2016 | Granbery | G06Q 20/24 |
| 2016/0321633 A1* | 11/2016 | Chandrasekaran | G06Q 20/20 |
| 2017/0017940 A1* | 1/2017 | Lee | G06Q 30/0207 |
| 2017/0017950 A1* | 1/2017 | Lee | G06Q 20/202 |
| 2017/0017951 A1* | 1/2017 | Lee | G06Q 20/202 |
| 2018/0293571 A1* | 10/2018 | Chiang | G06Q 20/3272 |
| 2019/0095901 A1* | 3/2019 | Gosalia | G06Q 20/322 |

FOREIGN PATENT DOCUMENTS

| | | |
|---|---|---|
| KR | 10-2008-0053253 A | 6/2008 |
| WO | 2015085809 A1 | 6/2015 |

OTHER PUBLICATIONS

Agarwal, A., "The 5th Generation Mobile Wireless Networks- Key Concepts, Network Architecture and Challenges", American Journal of Electrical and Electronic Engineering, Mar. 12, 2015, 8 pages, vol. 3, No. 2, https://www.researchgate.net/profile/Arun_Agarwal5/publication/.

* cited by examiner

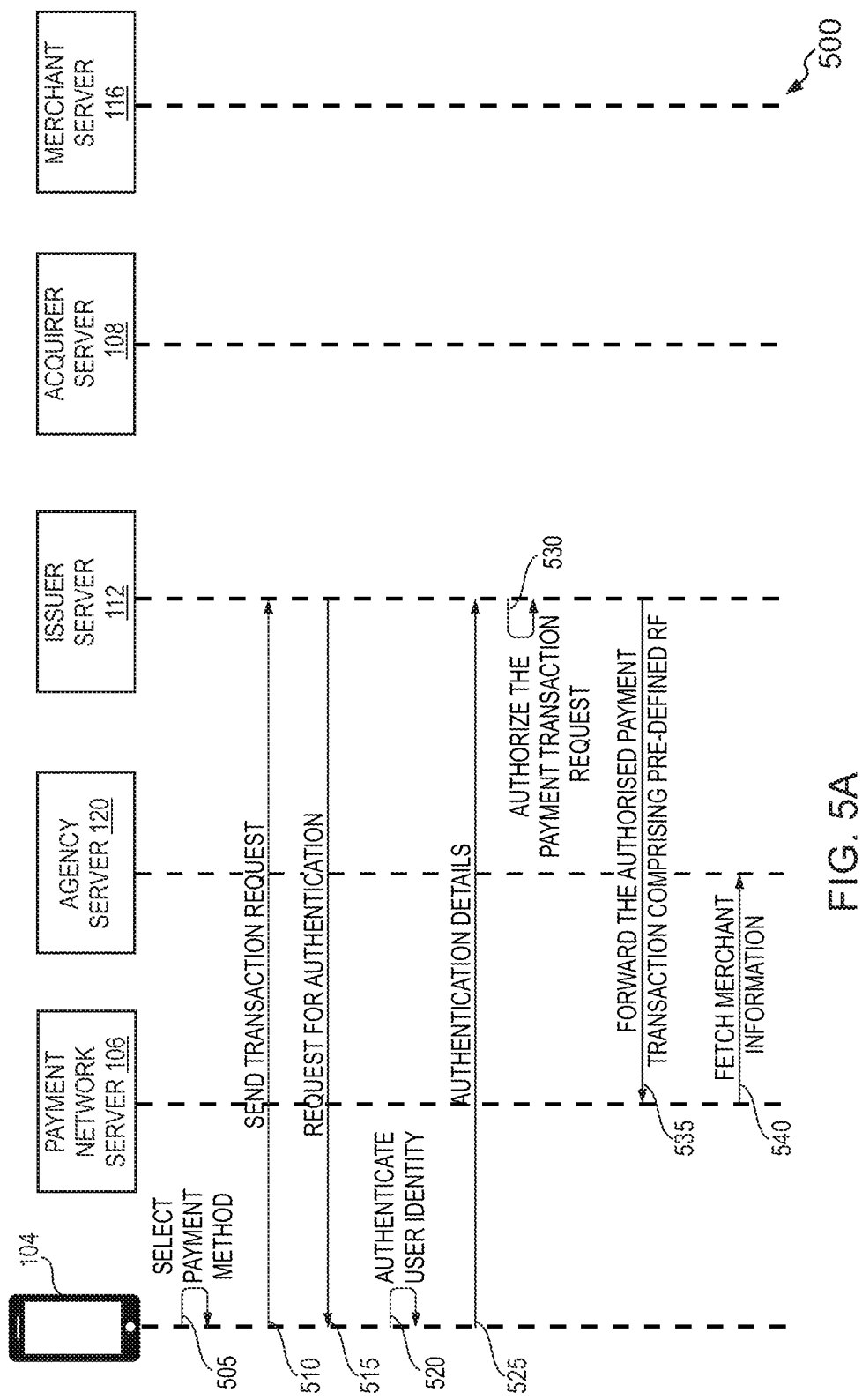

METHODS AND SYSTEMS FOR FACILITATING A PAYMENT TRANSACTION OVER A SECURE RADIO FREQUENCY CONNECTION

CROSS-REFERENCE TO RELATED APPLICATION(S)

This application claims priority to Indian Patent Application No. 202041031092, filed Jul. 21, 2020, entitled "METHODS AND SYSTEMS FOR FACILITATING A PAYMENT TRANSACTION OVER A SECURE RADIO FREQUENCY CONNECTION", the entirety of which is incorporated herein by reference.

TECHNICAL FIELD

The present disclosure generally relates to a payment technology and, more particularly to, methods and systems for processing payment transactions for a merchant using a radio frequency allocated to the merchant.

BACKGROUND

In the present time, customers have a variety of payment methods they could opt for when they go out for shopping in physical establishments. The payment methods range from debit/credit card payments to contactless RFID/NFC payments. Using mobile phones for making payments has become a routine with the growing technology. Paying to a merchant by scanning a QR code, or dipping a card on a Point of Sale (POS) terminal or even transferring money from electronic wallets are some of the common payment methods frequently utilized by customers. However, the methods still require users to stand in long queues and wait for their turn to reach the physical Point of Sale (POS) terminal to scan a QR code or dip an RFID card.

When customers go out for shopping to physical establishments, customers do not have the ability to determine how long the queues are. As a result, customers may go to a physical establishment when it is overcrowded and end up wasting time in huge queues. Furthermore, the physical establishments may lose customers for not adequately maintaining the queues. Potential customers may decide not to shop at a physical establishment that seems to have a huge number of people in queues.

Sometimes, conditions may happen such that the POS terminal may not be able to communicate with a payment network server for completing a payment transaction. This may occur due to a failure of connection between the POS terminal and payment network server. At other times, a POS terminal may not be able to send payment information to payment network server due to high load. In yet other times, these conditions can lead to delays in completing payments. The customers may lose patience if there is a lengthy delay in processing the payment. These delays may cause annoyance for customers wanting to make payment transactions.

Radio spectrum is the part of the electromagnetic spectrum ranging from 1 hertz (Hz) to 3000 gigahertz (GHz) or 3 terahertz (THz). Electromagnetic waves in this frequency range, called radio waves, have become widely used in modern technology, particularly in telecommunication. Using a specific radio frequency may provide a high range of connectivity for the merchant and linking the merchant account to the radio frequency may allow the users to make a payment to the merchant using the radio frequency.

Hence, there exists a need for the merchants with physical establishments to provide a fast and easy payment with high range of connectivity which enables the customers to make payment transactions possible from anywhere in the vicinity of a base station connectivity range which is usually city wide or even larger than that in some cases.

SUMMARY

Various embodiments of the present disclosure provide systems and methods for making a payment to a merchant.

In an embodiment, a method for performing a payment transaction is disclosed. The method includes receiving, by a payment network server from a user device, a connection request. The connection request includes a pre-defined radio frequency input for establishing a secure radio frequency connection between the user device and a merchant server of a merchant. The method includes facilitating, by the payment network server, establishment of the secure radio frequency connection between the user device and the merchant server over the pre-defined radio frequency. The method includes receiving, by the payment network server, a payment request signal. The payment request signal includes a pre-defined radio frequency information sent from an issuer server associated with an issuer of a payment account of a user of the user device. The method includes fetching, by the payments network server, a merchant information associated with the pre-defined radio frequency from a database. The method includes processing the payment transaction from the payment account to a merchant account based at least on the merchant information fetched from the agency server. The method further includes facilitating a transmission of a payment notification signal to the merchant server and the user device. The payment notification signal includes successful payment transaction from the payment account of the user to the merchant account.

In another embodiment, a payment network server for performing a payment transaction is disclosed. The payment network server includes a communication interface, a memory, and a processor. The memory includes stored instructions. The processor is configured to execute the stored instructions to cause the system to perform at least in part to receive, from a user device, a connection request. The connection request includes a pre-defined radio frequency input for establishing a secure radio frequency connection between the user device and a merchant server of a merchant. The system is caused to facilitate establishment of the secure radio frequency connection between the user device and the merchant server over the pre-defined radio frequency. The system is caused to receive a payment request signal including a pre-defined radio frequency information from an issuer server associated with an issuer of a payment account of a user of the user device. The system is further caused to fetch a merchant information associated with the pre-defined radio frequency from a database. The system is further caused to process the payment transaction from the payment account to a merchant account based at least on the merchant information. The system is further caused to facilitate a transmission of a payment notification signal to the merchant server and the user device of successful payment transaction from the payment account of the user to the merchant account.

Other aspects and example embodiments are provided in the drawings and the detailed description that follows.

BRIEF DESCRIPTION OF THE FIGURES

For a more complete understanding of example embodiments of the present invention, reference is now made to the following descriptions taken in connection with the accompanying drawings in which:

FIGS. 5A and 5B collectively, represent a sequence flow diagram for making a payment transaction from a payment account of the user to a merchant account of the merchant in accordance with an example embodiment;

DETAILED DESCRIPTION

Figure 1:
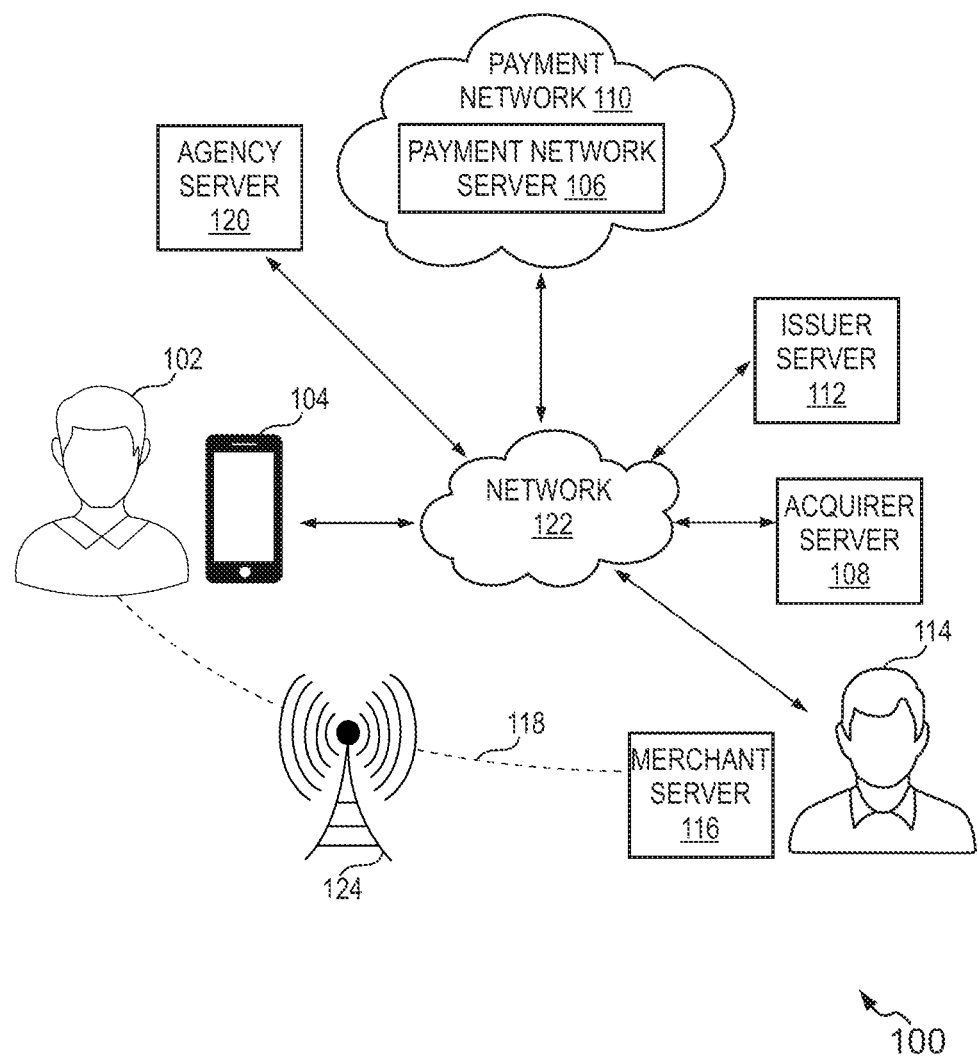
FIG. 1 illustrates an example representation of an environment, related to at least some example embodiments of the present disclosure.

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "pre-defined radio frequency" used throughout the description refers to a specific radio frequency (for e.g., 95.2 MHz) which will be allocated to a merchant by an agency after completion of a registration process of the merchant. This radio frequency can be used by a user of the user device to establish a secure radio frequency connection with the merchant server and make a payment transaction to the merchant.

The term "radio communication component" used throughout the description refers to a city wide antenna, a satellite or the like which facilitates communication over a specific radio frequency of the radio spectrum. The radio communication component maybe installed by the merchant or in some embodiments, the component may be provided by the agency server that allocates the radio frequency to the merchants.

The term "payment account" used throughout the description refers to a financial account that is used to fund the payment transaction. Examples of the payment account include, but are not limited to, a savings account, a credit account, a checking account, and a virtual payment account. The payment account may be associated with an entity such as an individual person, a family, a commercial entity, a company, a corporation, a governmental entity, a non-profit organization, and the like. In some scenarios, a payment account may be a virtual or temporary payment account that can be mapped or linked to a primary payment account, such as those accounts managed by PayPal®, and the like.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

OVERVIEW

Various example embodiments of the present disclosure provide methods, systems, user devices and computer program products for making a payment transaction to a merchant by using a pre-defined radio frequency allocated to the merchant, wherein radio frequency allocation is done by a third party agency which has the rights to allocate a particular frequency of a radio spectrum (for e.g., Government agency) to merchants. A user can utilize the pre-defined radio frequency allocated to the merchant to establish a secure radio frequency connection with the merchant server of the merchant and make a payment.

In an embodiment, a user, via his user device may establish a secure radio frequency connection with a merchant server of the merchant by utilizing the pre-defined radio frequency associated with the merchant. The payment network server is configured to receive a secure connection request from the user device and facilitate an establishment of secure radio frequency connection between the user device and the merchant server. After the secure radio frequency connection is established successfully, a successful connection message is transmitted to the user device, from the merchant server over the secure RF connection.

In an embodiment, the merchant has to go through a registration process in order to get a pre-defined radio frequency allocated to the merchant. This registration process is facilitated by an application provided by the payment network server. The merchant is asked to provide a plurality of information such as merchant name, shop name, account number and the like to an agency server using the application. Further, the agency server (e.g., Government server) is configured to complete the registration process. The agency server verifies the details provided by the merchant and if found eligible and authentic, the agency server allocates a pre-defined radio frequency for the merchant (for e.g., 95.2 MHz) using which a user can make payment to the merchant. Further, the sensitive information of the merchant such as account number, PAN number and the like are securely stored only in a database maintained by the agency.

In at least one embodiment, the present disclosure provides an application hosted by the payment network server, where the application can be installed on a remote device such as but not limited to the user device and the merchant server. The application facilitates the user to connect to the merchant server using the pre-defined radio frequency and to make a payment transaction to the merchant. The application takes the pre-defined radio frequency as an input from the user who is using the application on the user device. A secure connection request is sent to the payment network server after the user provides appropriate frequency input i.e., the pre-defined radio frequency in the application. Further, the payment network server is configured to establish a secure radio frequency connection between the user device and the merchant server of the merchant. The application allows the user to search for a merchant's pre-defined radio frequency by using one of a merchant name, a shop name and/or the like if the user is unaware of the pre-defined radio frequency. Further, the user can select a payment mode by which he/she wants to make a payment and authenticate user's identity. The application sends the details to an issuer server of the issuer associated with the payment account of the user for authorization.

Further in an embodiment, after the user has chosen the mode of payment and authenticated his/her identity, a payment transaction request is sent to the issuer server of the issuer associated with the payment account of the user. Furthermore, the issuer server authorizes the payment request and forwards it to the payment network server. The payment network server at this point has got the authorization from the issuer but is aware of the acquirer associated with the merchant account. The information of the merchant associated with the pre-defined radio frequency is stored in a database maintained by an agency. Therefore, the payment network server is configured to fetch the merchant information from the database of the agency for completing the payment process. The agency may include an agency server which facilitates data storage in a database and other processes performed by the agency.

In an embodiment, after the merchant information is fetched from the agency server, the payment network server processes the payment and sends transaction details and product requirement to the acquirer server associated with the acquirer of merchant bank. The acquirer server then transmits the details to the merchant server and the merchant server may further send the one or more products (for example, a bus ticket, a hotel reservation etc.) associated with the product requirement back to the acquirer server. The acquirer server may send a first confirmation message including the payment transaction details and the one or more products received from the merchant server to the payment network server and the payment network server further forwards it to the issuer server, and the issuer server sends it to the user device. The user receives the payment confirmation message associated with the payment transaction on the user device. This confirmation message is referred to as "first confirmation message" throughout the description.

In at least one embodiment, the present disclosure describes about establishing a secure radio frequency connection between the user device and the merchant server of the merchant associated with the pre-defined radio frequency inputted by the user on the user device. The secure connection establishment is facilitated by establishing a 3-way/4-way handshake between the user device and the merchant server over the pre-defined radio frequency. In an embodiment, a secure and encrypted tunnel is created, and features like session timeouts and idle timeouts can be imposed on the secure tunnel so that the connection is kept highly secure and away from fraudsters and hackers. After the successful establishment of the secure radio frequency connection, the user can make payment to the corresponding merchant.

As the secure connection is established between the user device and the merchant server, a successful connection message is sent to the user device from the merchant server over the secure radio frequency connection. Further, the payment transaction may be initiated by the user. The payment transaction is completed in the standard Business as Usual (BAU) format from the issuer server to the acquirer server via the payment network server, and a first confirmation message is sent to the user device from the issuer server side after the completion of the payment transaction. Further, in an embodiment described in the present disclosure, a second confirmation message is sent to the user device from the merchant server, over the secure radio frequency connection after the payment transaction is completed. These confirmation messages may include payment transaction details and one or more products associated with the product requirement. The one or more products maybe the products chosen by the user on the application, such as a train ticket, a flight ticket, a hotel reservation, etc.

In an alternate embodiment, the user may be present at the physical establishment (e.g., a supermarket) of the merchant. The user may pick up the required products from the establishment in person and may want to make a payment transaction to the merchant using the application for purchasing the products. In this scenario, the user can input the pre-defined radio frequency associated with the merchant for establishment of a secure RF connection. After the user has inputted the pre-defined radio frequency in the application, a secure connection request is sent to the payment network server. The payment network server may further establish the secure RF connection between the user device and the merchant server of the merchant. The user device may receive a successful connection message after the establishment of the secure RF connection. Further, the user may proceed to make a payment to the merchant in the same manner, as discussed above. The user may make a payment transaction from anywhere within the vicinity of radio frequency connection, in the establishment or outside the establishment without the need to stand in a queue for his/her turn.

Various example embodiments of present disclosure are described hereinafter with reference to FIGS. 1 to 9.

FIG. 1 illustrates an exemplary representation of an environment 100 related to at least some example embodiments of the present disclosure. The environment 100 generally includes a user device 104 being used by an user 102, a payment network server 106, a payment network 110, an acquirer server 108 associated with a merchant account of the merchant 114, an issuer server 112 associated with the payment account of the user 102, a merchant server 116 associated with the merchant 114 and a secure radio frequency (RF) connection 118 established between the user device 104 and the merchant server 116, an agency server 120 which may be maintained by the government or any third party agency. The payment network 110 maybe coupled to and is in communication with (and/or with access to) a network 122. The network 122 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 122 may include a combination of different networks, such as a private network made accessible by the payment network server 106 to the acquirer server 108, the issuer server 112, the user device 104, the merchant server 116 and the agency server 120, and, separately, a public network (e.g., the Internet) through which the acquirer server 108, the issuer server 112, user device 104, merchant server 116, the agency server 120, and the payment network server 106 may communicate among each other.

Figure 2:
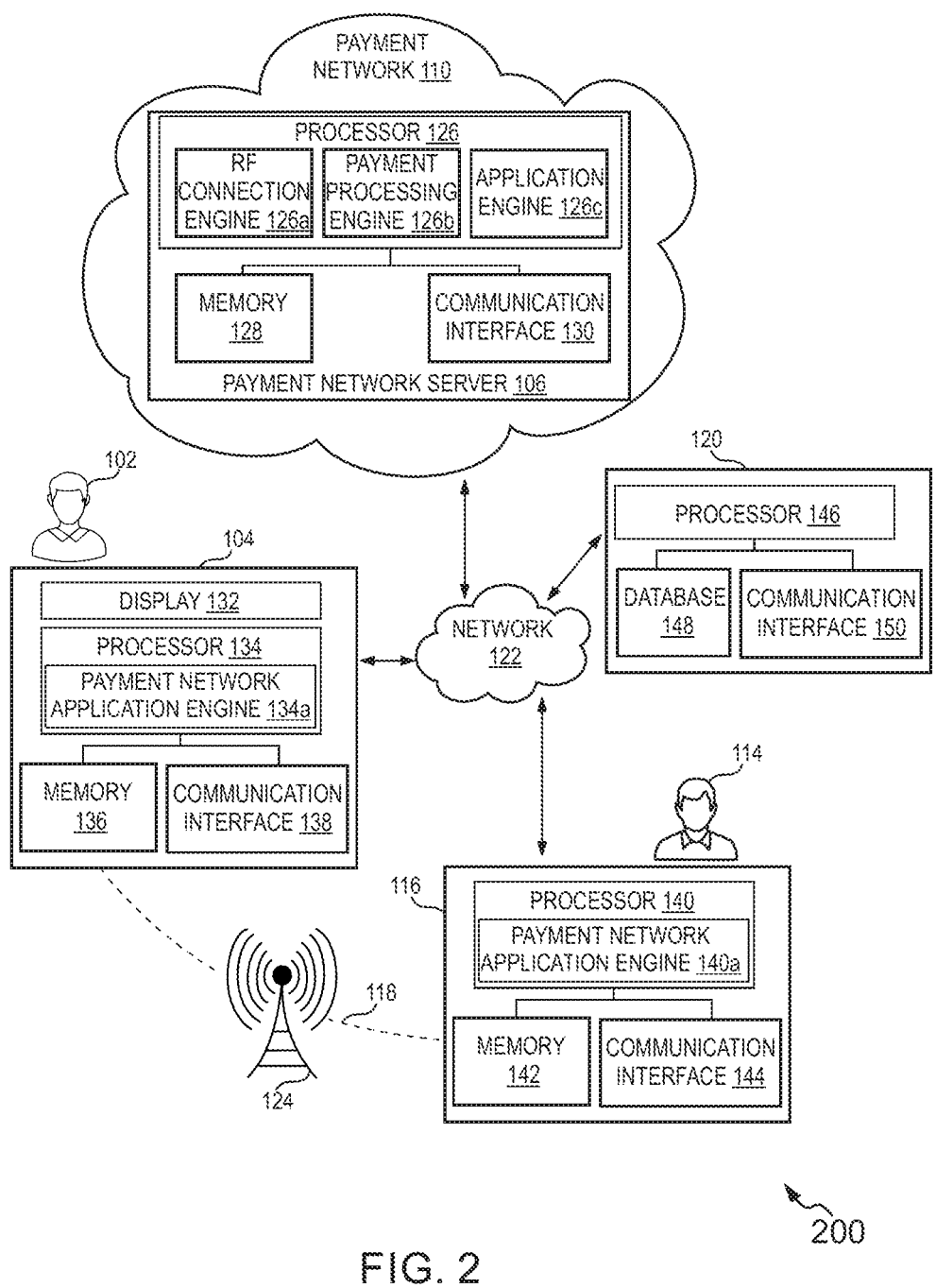
FIG. 2 is a block diagram of a payment network server facilitating the establishment of a secure RF connection between the user device and the merchant server, in accordance with one embodiment of the present disclosure.

The user 102 may be using an application provided by the payment network server 106 called the "payment network application" facilitated by a payment network application engine 134a (Refer FIG. 2). The application provided by the payment network server 106 enables users to input a pre-defined radio frequency associated with the merchant 114. The payment network server 106, in response to the receipt of the input, establishes a secure radio frequency connection between the user device 104 and the merchant server 116. The application facilitates the user 102 to make payment to the merchant 114 associated with the pre-defined radio frequency inputted by the user. When the user inputs the pre-defined radio frequency (say 95.2 MHz) associated with a merchant (for e.g., YZX hotel Chain), the payment network server 106 is configured to map the corresponding merchant server 116 associated with the pre-defined radio frequency. The payment network server 106 stores a list of merchants with its corresponding pre-defined radio frequencies allocated to it, in a data storage memory of the server.

The payment network server 106 may further establish a secure radio frequency connection 118 between the merchant server 116 and the user device 104. This secure RF connection is isolated from the internet and any other form of communication and solely established on a radio spectrum. The payment network server 106 enables the user device 104 to establish a 4-way/3-way handshake with the merchant server 116, creating a secure tunnel for data communication between the user device 104 and the merchant server 116. The secure connection is encrypted and features like session timeout and idle timeout may be implemented on the secure connection to make it highly secure and away from fraudsters and hackers.

After the secure connection is established between the user device 104 and merchant server 116, a successful connection message is sent to the user device 104 from the merchant server 116 over the secure RF connection 118. This message notifies the user 102 that the secure RF connection has been established and the user 102 can proceed to choose one or more products and/or make a payment to the corresponding merchant. In an embodiment the application maintained by the payment network server 106 facilitates the user 102 to search for the merchant's pre-defined radio frequency by suing a merchant name, a shop name, and the like, in case if the user 102 is unaware of the pre-defined radio frequency allocated to the merchant.

In another embodiment the payment network application, after the establishment of the secure RF connection 118, is configured to provide the user 102 with a list of products that the user can buy from the merchant 114 and make a payment transaction to the merchant 114, for the corresponding purchase. In the above embodiment, as said in an example the user 102 may be provided with the different types of rooms provided by the merchant i.e., YZX Hotel Chain. The user 102 may select any of his/her desired choices and make a payment to YZX Hotel Chain for the corresponding purchase made.

Further, the user 102 may proceed to make a payment transaction to the merchant 114 using the payment network application on the user device 104. The application may provide an option for the user 102 to select a payment method which may be one of but not limited to a debit card, a credit card, or a mobile banking. The issuer corresponding to the payment account of the user 102 can be mapped based on the payment method selected by the user 102 and a payment transaction request is sent to the issuer server 112 of the issuer associated with the payment account of the user 102. The pre-defined radio frequency associated with the merchant 114 is also sent to the issuer server 112, along with the payment transaction request. The issuer server 112 is configured to check the payment transaction details and approve the payment transaction request, and may further instruct the user 102 to authenticate his/her identity on the user device 104 by using at least one of, but not limited to an OTP authentication, Biometric authentication, and PIN code. In some embodiments, the product requirement of the user may also be sent to the issuer server. The product requirement includes the one or more products chosen by the user for purchasing, on the application.

The user 102 may authenticate his/her identity using any standard authentication method defined by his/her issuer. The authentication details are sent to the issuer server 112. The issuer server 112 is further configured to authorize the payment transaction request and forward the payment transaction authorization along with the pre-defined radio frequency associated with the merchant, to the payment network server 106 for further processing. The payment network server 106, at this point has the authorization for the payment transaction from the issuer of the payment bank associated with the user 102, but the acquirer associated with the merchant bank account is not known since the issuer server has only sent the payment transaction authorization along with the pre-defined radio frequency associated with the merchant. In some embodiments, the issuer server 112 is configured to send the product requirement along with the payment transaction authorization and the pre-defined radio frequency.

In order to map the payment transaction to the acquirer of the merchant account, the payment network server 106 is configured to fetch merchant information from a database maintained by the agency in the agency server 120. The agency server 120 is configured to store the information related to a plurality of merchants who are registered with the agency and have gotten a pre-defined radio frequency allocated to them, in the database. The database stores the personal information related to the plurality of registered merchants and bank account details of the account linked to the pre-defined radio frequency allocated to the plurality of merchants. The registration process will be explained in detail, later in the specification.

The payment network server 106, may transmit a request signal to fetch the information related to the merchant 114 associated with the pre-defined radio frequency from the database of an agency server 120. The payment network server 106 may further fetch all the required information regarding the merchant 114 and the merchant account in order to compete the payment. The payment network server 106 based on the fetched information, may process the payment transaction, and forward the payment transaction details to the acquirer server 108 of the acquirer associated with the merchant account. In some embodiments, the payment network server 106 is configured to send the product requirement along with the payment transaction details to the acquirer server.

The acquirer server 108 is further configured to forward the details received from the payment network server 106 to the merchant server 116. In some embodiments, the merchant server is configured to send the one or more products in case the details received from the payment network server 106 includes product requirement such as hotel room booking etc. The merchant server 116 may send the transaction details and the one or more products associated with the product requirement back to the acquirer server 108. The acquirer server 108 is configured to then forward the details received from the merchant server 116 to the payment network server 106. The payment network server 106 may then forward the same to the issuer server 112 of the issuer associated with the payment account of the user 102. The issuer server 112 is configured to send the transaction details and the product requirement to the user device 104. The details act as a confirmation for a successful payment transaction. This confirmation message is called as first transaction confirmation message throughout the description. The first confirmation message may include a transaction number (Txn ID or Txn number), a confirmation ID etc. In an embodiment, the payment network server may also forward the one or more products associated with the product requirement. The one or more products may be chosen by the user 102 before the initiating the payment on the payment network application.

Further in an embodiment, a secure radio frequency connection 118 is established between the user device 104 and merchant server 116 over the radio frequency facilitated by a radio communication component 124. The radio communication component 124 maybe a city-wide antenna or a satellite which facilitates the user to communicate over the pre-defined radio frequency. A successful connection message is sent to the user device 104 from the merchant server 116 over the secure RF connection 118 after the successful establishment of the connection. Further in an embodiment, after the completion of the payment from the user's payment account to the merchant account, a second confirmation message is sent to the user device 104 directly from the merchant server 116 over the secure radio frequency connection 118. Thus, the user may receive two confirmation messages, one from the issuer server 112 and another one directly from the merchant sever 116. The second confirmation may also include a transaction number, a confirmation ID. In some embodiments, the second confirmation message may include the one or more products associated with the product requirement.

In an alternate embodiment, the user 102 may visit a physical establishment of the merchant and pick up the goods that he/she requires and make the corresponding payment for the picked up goods by using the application provided by the payment network server 106. This allows the user to make a payment transaction from anywhere in the shop as the user 102 can connect to the merchant over the pre-defined radio frequency and make payment transactions using the application. The user need not wait in a queue for his/her turn to pay the bill. The user 102 is capable of paying from anywhere in/out of the shop if the location is covered in the vicinity of the range provided by the radio communication component 124.

Now referring to FIG. 2, a simplified block diagram 200 including the payment network server 106, the payment network 110, the user 102 using the user device 104, the agency server 120, the network 122 and the merchant server 116 associated with the merchant 114, is illustrated. The payment network server 106 includes a plurality of components such as a processor 126, memory 128, a communication interface 130. The processor 126 may further include components such as a RF connection engine 126a, a payment processing engine 126b, and an application engine 126c. A payment network server 106 may be facilitated in a payment network 110 which enables the payment network server 106 to communicate with various components such as but not limited to the user device 104, the merchant server 116 and the agency server 120.

As shown, the user device 104 may include a plurality of components such as a display 132, a processor 134, a memory 136 and a communication interface 138. The processor 134 may include a payment network application engine 134a which facilitates the user 102 to use the application provided by the payment network server 106. Further, the merchant server also includes a plurality of components such as a processor 140, a memory 142 and a communication interface 144. The processor 140 includes a payment network application engine 140a to facilitate the merchant to make use of the application provided by the payment network server 106. The agency server 120 is a server system maintained by an agency designated to allocate pre-defined radio frequencies to the merchants. The agency server 120 includes a plurality of components such as a processor 146, a database 148 and a communication interface 150. The database 148 is used to store sensitive information of the registered merchants such as personal details and bank account details of the account linked to the pre-defined radio frequency.

In an embodiment of the present disclosure, the merchant 114 who wants to utilize this option of linking a bank account to a pre-defined radio frequency and accept payment using the same, has to register with the agency and link his/her bank account to the pre-defined radio frequency. The merchant may download the application provided by the payment network server 106 on a device such as a merchant server 116, and may initiate the registration process using the same. The application used by the merchant 114 is facilitated on the merchant server by the payment network application engine 140a. The registration process may be carried out on the application, but the registration is facilitated by the agency which is designated to allocate radio frequencies to the merchants (for e.g., Government agency). The merchant may provide all the required details such as but not limited to account number, bank name, PAN number and personal details.

The agency server 120 is configured to verify the details and if found eligible, allocate a pre-defied radio frequency, and link a bank account to the pre-defined radio frequency. The agency server 120 is further configured to store all the details associated with the merchant 114. This allocated radio frequency is called pre-defined radio frequency throughout the description. The sensitive data related to the merchant 114 will only be stored on the database 148 maintained by the agency server 120. This ensures the privacy and security of the merchants' personal and account details. The agency server 120 allocates a pre-defined radio frequency (say for e.g., 95.2 MHz) to the merchant and the merchant may start accepting payments over this frequency irrespective of the place, branch, or type of the merchant establishment. The merchant can be for example "ABC Railways". The pre-defined radio frequency 95.2 MHz may be utilized to make payment to ABC Railways from anywhere under the coverage of the radio communication network.

The radio communication component 124 is configured to facilitate communication over the pre-defined radio frequency. The radio communication component 124 may be a city-wide antenna, a satellite and the like which will be maintained by the merchant as per the merchant requirements. A plurality of merchants may register and get a pre-defined radio frequency allocated to themselves by the above mentioned process. All the data and frequency management is taken care of by the agency server 120. Additionally, a list of merchants mapped to their pre-defined radio frequencies will be stored in the memory 128 of the payment network server 106 as well.

Further, moving onto the user's side, the user 102 may also have installed the application provided by the payment network server 106 on the user device 104. The application may be facilitated on the user device by the payment network application engine 134a of the processor 134 on the user device 104. In an example embodiment, the user 102 may open the application on the user device 104 and request for an establishment of secure connection with the merchant server 116 over the pre-defined radio frequency by inputting the pre-defined radio frequency (say 95.2). The payment server based on the list stored in the memory 128 may map the merchant associated with the input pre-defined radio frequency and establish a secure RF connection between the user device 104 and the merchant server 116 associated with the merchant 114 (for e.g., ABC Railways).

In an alternate embodiment, the user 102 may be unaware of the pre-defined radio frequency. In such scenarios, the application may facilitate the user 102 to search for pre-defined radio frequency associated with a plurality of merchants by inputting at least one of a merchant name, shop name and the like. In the example embodiment, user may enter the merchant name as 'ABC Railways' and the application will display the pre-defined radio frequency associated with the merchant i.e., 95.2 MHz on the display 132 of the user device 104.

After the user has input the pre-defined radio frequency associated with the merchant 114, the payment network server 106 utilizes the list of merchants stored in the memory 128. The payment network server 106 may map the merchant server which has been allocated the pre-defined radio frequency input by the user. The payment network server may now facilitate a secure RF connection 118 between the user device 104 and the merchant 114 over a radio communication. The radio communication component 124 may facilitate a secure radio communication between the user device 104 and the merchant server 116 over the pre-defined radio frequency (say 95.2 MHz). In an embodiment, after the secure RF connection 118 is successfully established, a successful connection message is transmitted to the user device 104 from the merchant server 116 over the secure RF connection 118 itself.

This connection is exclusively maintained for data communication between the user device 104 and the merchant server 116. Further after the secure RF connection 118 is established, the user may initiate a payment to the merchant 114 using the payment network application on the user device 104. The user 102 may, in some embodiments select one or more products that he/she wants to buy. The app may facilitate the user to select the one or more products that the user 102 wishes to buy from the merchant 114. The payment network application may further allow the user to make a payment transaction to the merchant 114 on the user device 104.

Furthermore, the user may be directed to a payment page on the display 132 of the user device 104. The user may choose one of a payment method such as a debit card, a credit card, an UPI payment, and the like. The user 102 may choose a payment method and authenticate his/her identity and the payment goes through a Business as Usual (BAU) method. Accordingly, the issuer first authorizes the payment and forwards the payment transaction authorization and the pre-defined radio frequency to the payment network server 106. The payment network server 106 may fetch the merchant account details from the database 148 of the agency server 120. Based on the information, the payment network server 106 is configured to map the acquirer server 108 of the acquirer of the merchant bank. The payment network server 106 may process the payment transaction and send the transaction details and the product requirement to the acquirer server 108. The acquirer server 108 may further forward the transaction details and the product requirement to the merchant server 116. The merchant server 116 may then send the one or more products chosen by the user and the payment transaction details back to the acquirer server 108. The confirmation message will then be forwarded to the payment network server 106, from payment network server 106 to the issuer server 112 and from issuer server 112 to the user device 104.

In an embodiment, as soon as the merchant server 116 receives the payment transaction details and the product requirement from the acquirer server 108, the merchant server 116 may send the one or more products associated with the product requirement and the payment transaction details directly to the user device 104 over the secure RF connection 118. This confirmation message is sent to the user device 104 directly over the exclusive secure RF connection 118 established between the user device 104 and the merchant server 116. The secure RF connection is an encrypted tunnel established in a highly secure manner. Any data communication made on the secure RF connection 118 will be encrypted and can only be decrypted by the end point servers.

Figure 3:
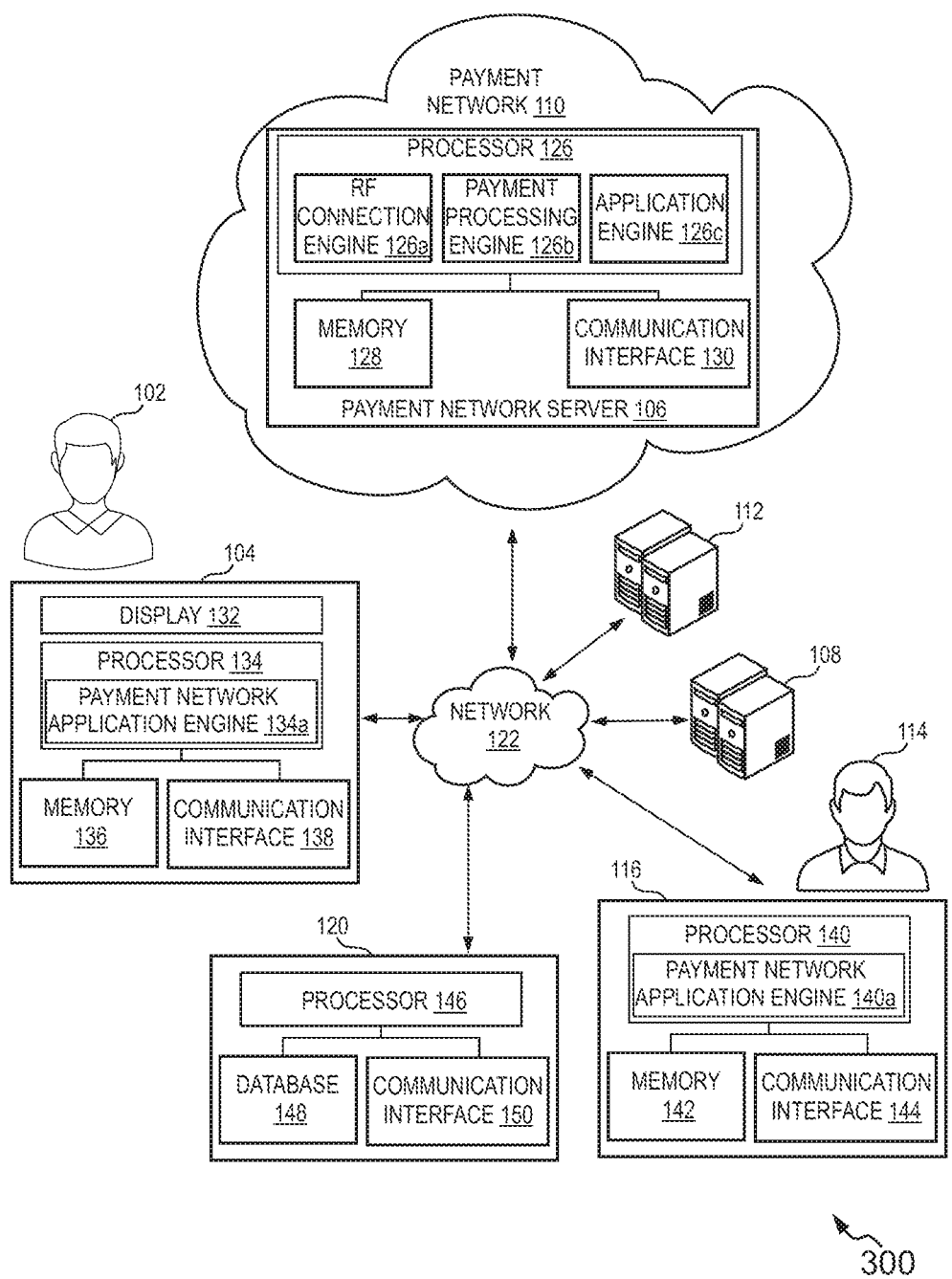
FIG. 3 is a block diagram of a payment network server, an issuer server, an acquirer server, a user device, a merchant server, and an agency server for facilitating the completion of payment transaction, in accordance with one embodiment of the present disclosure.

Now turning to FIG. 3, a simplified block diagram 300 including the payment network server 106, payment network 110, user device 104 associated with the user 102, issuer server 112, acquirer server 108, network 122, agency server 120, and the merchant server 116, is illustrated. The payment network server 106 includes a plurality of components such as a processor 126, memory 128, communication interface 130. The processor 126 may further include components such as a RF connection engine 126a, a payment processing engine 126b, and an application engine 126c. A payment network server 106 may be facilitated in a payment network 110 which enables the payment network server 106 to communicate with various components such as but not limited to a user device 104, a merchant server 116, an issuer server 112, an acquirer server 108 and an agency server 120.

As shown, the user device 104 may include a plurality of components such as a display 132, a processor 134, a memory 136 and a communication interface 138. The processor 134 may include a payment network application engine 134a which facilitates the user 102 to use the application provided by the payment network server 106. Further, the merchant server also includes a plurality of components such as a processor 140, a memory 142 and a communication interface 144. The processor 140 may also include a payment network application engine 140a to facilitate the merchant to make use of the application provided by the payment network server 106. The agency server 120 is a system maintained by an agency designated to allocate pre-defined radio frequency to the merchants. The agency server 120 includes a plurality of components such as a processor 146, a database 148 and a communication interface 150. The database 148 is used to store sensitive information of the registered merchants.

The issuer server 112 is a server system maintained by the issuing bank of the user 102. The issuer server 112 is configured to receive payment transaction requests and authorize the payment. The server system then authorizes the payment transactions and sends the authorized payment transaction to the payment network server 106. The payment network server 106 is configured to forward the payment transaction to the acquirer server 108 of the acquirer bank associated with the merchant account. The processing of the payment transaction will be discussed in detail below.

As shown in the FIG. 3, the user 102 is associated with a user device 104. The user device 104 may be one of a Smartphone, Laptop, Desktop Computer, Tablet, and the like. The user device 104 includes a plurality of components. The display 132 maybe a touch screen display and may act as an interface for the user 102 to use the application provided by the payment network server 106. The processor 134 includes a component called payment network application engine 134a. This component is configured to facilitate the application provided by the payment network server 106. The memory 136 may store any data related to the user and the application. The communication interface 138 is configured to facilitate any type of communication between the components of the user device 104 and any other server system residing at remote locations.

The user 102 may input a pre-defined radio frequency the application on the user device 104 in order to establish a secure RF connection 118 with the merchant server 116 as discussed in FIG. 2. After the secure RF connection 118 is established, the user 102 may be directed to a payment page. The user 102 may be displayed with a page on the user device 104 where he/she can choose a payment method and authenticate his identity to confirm the payment. For example, the user 102 may choose to pay through a debit card issued to him by "QRS bank". Now, the payment transaction request will be sent to the issuer server 112 which may be a server associated with QRS bank. The issuer server 112 is configured to further request the user 102 to authenticate his/her identity. The user 102 may, at this point authenticate his/her identity by any of the standard authentication methods as defined by the issuer bank.

The issuer server 112, after receiving the authentication data of the user, may verify the authenticity and if found authentic, the issuer server 112 is configured to authorize the payment transaction request and forward the payment transaction authorization and the pre-defined radio frequency to the payment network server 106 to follow up with the acquirer. In some embodiments, the issuer server 112 is configured to send product requirement to the payment network server 106. The product requirement is associated with the products selected by the user on the application.

The payment network server 106 maybe maintained by a payment network 110 such as the one maintained by Mastercard®. The payment network server 106 is configured to receive the authorized payment transaction and the pre-defined radio frequency from the issuer server 112 and now is configured to direct the payment transaction to the acquirer associated with the merchant account of the merchant 114. As this is a pull payment request and the acquirer bank details are not known, the payment server needs to fetch the acquirer details. For instance, the payment network server 106 may only be aware of the pre-defined radio frequency and the merchant 114 associated with the pre-defined radio frequency.

As discussed above, the account details of the merchant will only be stored in the database 148 maintained by the agency server 120. The agency may for example be a Government agency. The payment network server 106 may send a request signal to this agency server 120 to fetch the information related to the merchant 114 and the details related to the merchant account linked to the pre-defined radio frequency, and any other details required to process the payment transaction. The acquirer bank of the merchant 114 may for example be "SEY bank". Now the payment network server 106 will forward the payment transaction details and product requirements to the acquirer server 108 maintained by SEY bank. The product requirements may be related to the one or more products chosen by the user 102 on the application provided by the payment network server 106. For example, if the merchant 114 is ABC Railways, the product requirement may be one or a combination of a train ticket, a platform ticket, and the like.

After the acquirer server 108 has received the transaction details and product requirement, the acquirer server 108 is configured to forward the same to the merchant server 116. The merchant server 116 may further send the information of products associated with the product requirements back to the acquirer server 108. The acquirer server 108 may further send the product details and the transaction details to the payment network server 106. The payment server 106 may then redirect the same to the issuer server 112 of the QRS bank. The issuer server 112 may further send the same to the user device 104 confirming the payment transaction and the products that the user 102 requested and made a payment for.

Based on the details discussed above in FIG. 2 and FIG. 3, the user 102 may receive the transaction confirmation details and the products associated with the product requirement from the issuer server 112 of the payment account of the user 102 and also another confirmation message directly from the merchant server 116 over the secure RF connection 118. Hence, the user 102 receives confirmation message and the products from two server systems, one over the usual cellular/mobile carrier network and the other over a secure RF connection 118.

Figure 4:
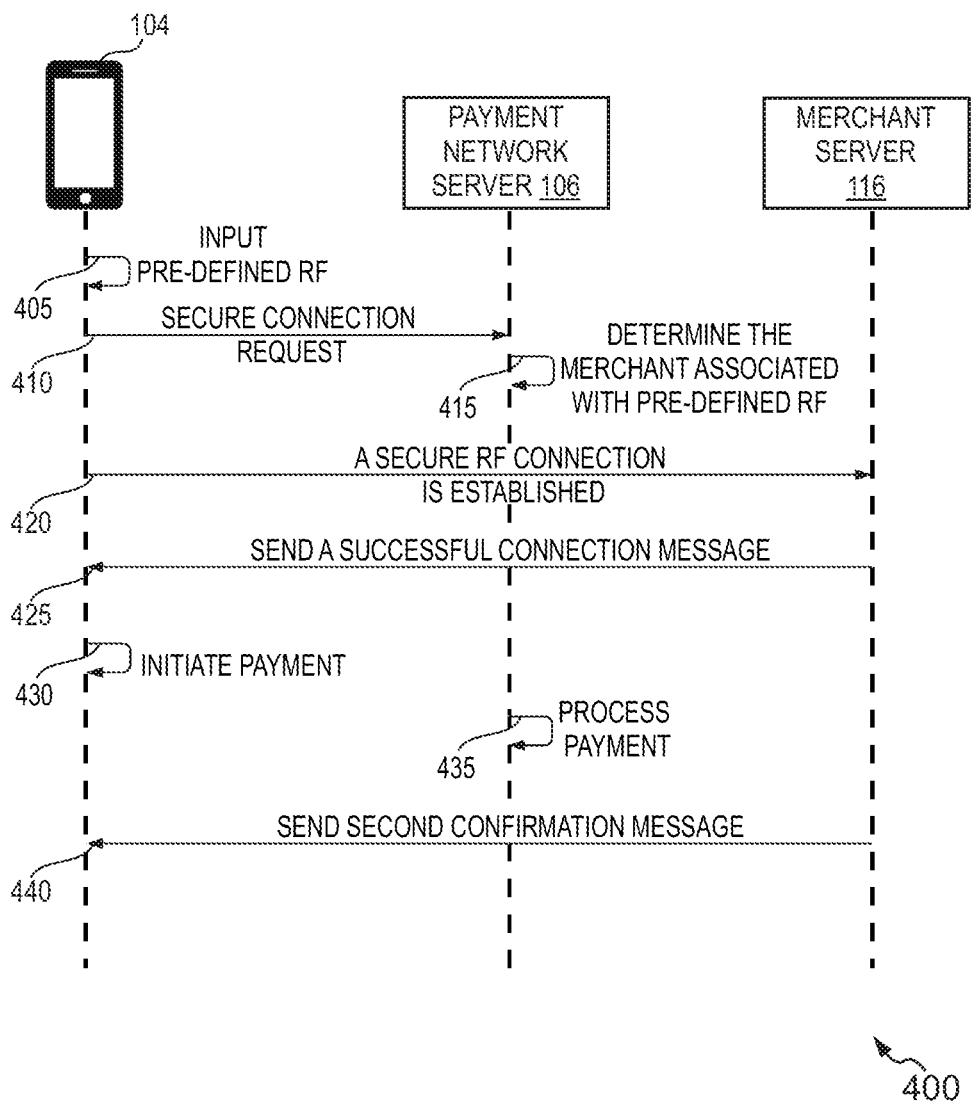
FIG. 4 is a sequence flow diagram for establishing a secure radio frequency connection between the user device and the merchant server in accordance with an example embodiment.

Turning now to FIG. 4, a sequence flow diagram 400 for establishing a secure RF connection between the user device 104 and a merchant server 116, is shown, in accordance with an example embodiment. The sequence of operations of the sequence flow diagram 400 may not be necessarily executed in the same order as they are presented. Further, one or more operations may be grouped together and performed in form of a single step, or one operation may have several sub-steps that may be performed in parallel or in sequential manner.

At 405, the user 102 may utilize the application provided by the payment network server on the user device 104. The user 102 may input a pre-defined radio frequency associated with the merchant 114 to whom he/she wants to make a payment transaction. In an alternate embodiment, the use may search for a pre-defined radio frequency using a name search of merchant/shop if the user 102 is unaware of the pre-defined radio frequency. In an example embodiment, the user 102 may enter 95.2 MHz as a pre-defined radio frequency to establish a secure RF connection with the merchant associated with the radio frequency. In the example embodiment, the merchant associated with 95.2 MHz may be ABC Railways.

At 410, after the user 102 has entered the pre-defined radio frequency and has requested establishment of a secure RF connection with the merchant server 116, the user device 104 sends a secure connection request to the payment network server 106 by inputting the pre-defined radio frequency associated with the merchant 114. In the example embodiment, the user device 104 may send a connection request to the server of ABC Railways.

At 415, the payment network server 106 determines the merchant who is associated with the pre-defined radio frequency input by the user 102 for the establishment of secure RF connection. The payment network 110 has a memory 128 associated with its payment network server 106. A list of pre-defined radio frequencies with the corresponding merchants associated with the frequencies is stored in the memory 128. The payment network server 106 is configured to check the database and determine the merchant associated with the radio frequency input by the user 102.

At 420, the secure RF connection is established between the user device 104 and the merchant server 116 over the radio communication line rendered by the radio communication component 124 (check FIG. 1). A 3-way or a 4-way handshake is established between the user device 104 and the merchant server 116. This connection is maintained as a secure tunnel and the data communicated between the end points are encrypted for security purposes. Some more features like session timeout and idle timeout are also rendered for the established secure RF connection. Any form of data communication can be done on the secure RF connection 118.

At 425, a successful connection message is sent to the user device 104 from the merchant server 116 over the secure RF connection 118. The message may contain information confirming the connection establishment along with the merchant name and the pre-defined radio frequency. After this point, in an embodiment, the user 102 may be displayed with a list of products which is provided by the merchant with whom the user has established a secure RF connection. The merchant may be ABC Railways and the products that are provided by them may be train ticket, platform ticket and the like. The user may choose any one or a combination of items and make a payment to ABC railways directly using the application on the user device 104.

At 430, the user device 104 initiates a payment. The user 102 may choose a payment method and the payment transaction request goes to an issuer server and the issuer server requests the user to authenticate his/her identity and the user may authenticate the identity by any standard method defined by the issuer. The issuer then verifies all the required details and the authenticity of the user and authorizes the payment transaction and forwards the payment to the payment network server 106. The issuer server is not shown in the FIG. 4 as the payment flow is discussed in-detail in the FIG. 5.

At 435, the payment server may further process the payment transaction by forwarding the transaction details and product requirements to the acquirer server and complete the payment transaction. The acquirer server may further send the transaction details and the product requirements to the merchant server 116.

At 440, the merchant server may then send a confirmation message to the user device directly through the secure RF connection 118. This message is named as a second confirmation message as another confirmation message is received by the user device 104 from the issuer server associated with the issuer of the user 102.

Figure 5B:
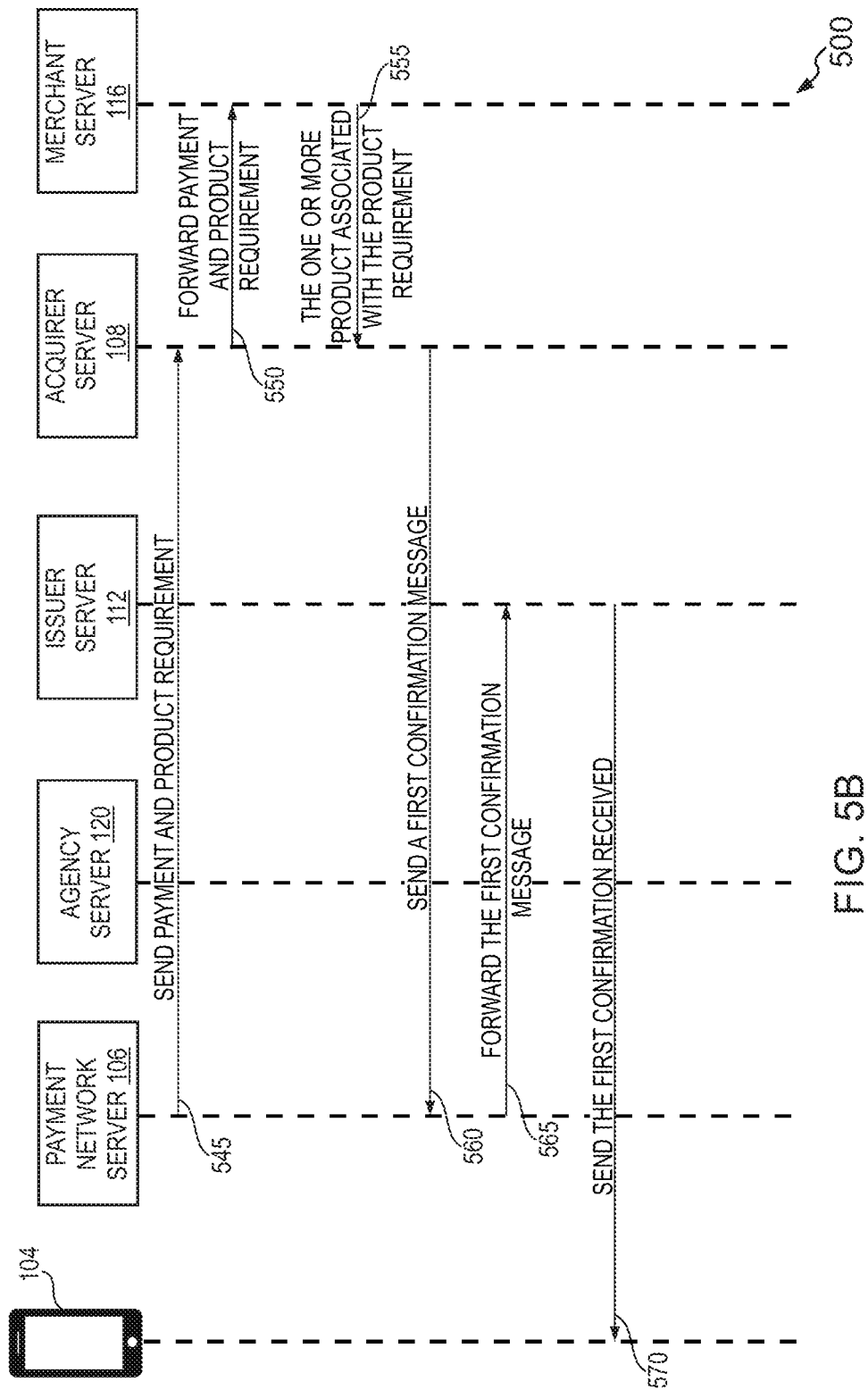

FIGS. 5A-5B, collectively, represent a sequence flow diagram 500 for facilitating the payment transaction from the payment account of the user 102 to the merchant account of the merchant 114 using the payment network application on the user device 104, in accordance with an example embodiment. The sequence of operations of the sequence flow diagram 500 may not be necessarily executed in the same order as they are presented. Further, one or more operations may be grouped together and performed in form of a single step, or one operation may have several sub-steps that may be performed in parallel or in sequential manner.

At 505, the user may be using the payment network application on the user device 104 and has already established a secure RF connection 118 with the merchant server 116. After the establishment of the secure RF connection 118, the payment network application on the user device 104 may display a product selection, payment method selection and authentication interface (see, 740 in FIG. 7C) of the user 102. The user 102 may select the required products and may proceed to make a payment for the same. To proceed with the payment, the user 102 may choose a payment method which may be one of but not limited to debit card, credit card, UPI, and wallet.

At 510, after the user 102 has chosen the payment method, a payment transaction request is sent to the issuer server 112 associated with the issuer of the payment account of the user 102. At 515, the issuer server 112 may check the payment transaction details and request the user 102 to authenticate his/her identity.

At 520, the user 102 may authenticate his/her identity by one of a standard authentication process defined by the issuer server 112. Authentication process may be one of but not limited to biometric authentication, OTP authentication, and PIN code. At 525, the authentication details are sent to the issuer server 112.

At 530, after receiving the authentication details, the issuer server 112 may check the same and if the payment transaction is found eligible and the user 102 is found authentic, the issuer server 112 may authorize the payment transaction and direct the payment transaction to the payment network server 106 for further processing.

At 535, the issuer server 112 may forward the authorized payment transaction along with the pre-defined radio frequency input by the user 102 to the payment network server 106. The payment network server 106 is configured to process the payment and map the transaction to the acquirer bank associated with the merchant account. However, the payment network server 106, at this point of time, is unaware of the acquirer associated with the merchant 114 as the issuer of the payment card of the user 102 has only sent the pre-defined radio frequency associated with the merchant which was provided as input by the user 102.

At 540, the payment network server 106 is configured to fetch information related to merchant associated with the pre-defined radio frequency received from the issuer server 112 from a database 148 maintained by the agency server 120 associated with an agency. The agency may be a government agency, or any third party agency designated to allocate radio frequency to the registered merchants. The agency server 120 is configured to store all the sensitive information related to the registered merchants. The sensitive information may include account details, shop, and personal details of the merchant. Hence, the payment network server 106 fetches the merchant information in order to map the payment transaction to the acquirer of the merchant account. After the information is fetched, the payment network server 106 may forward the transaction details and the product requirements to the acquirer server 108 of the acquirer associated with the merchant account.

At 545, the payment network server 106 is configured to send the payment transaction details and the product requirements to the acquirer server 108. The product requirements may include the details or product ID of the one or more products selected by the user 102. The acquirer server may further forward the same to merchant server 116.

At 550, the acquirer server 108 is configured to forward the transaction details and the product requirement to the merchant server 116. The merchant server 116 is configured to produce/arrange the one or more products associated with the product requirement. For instance, issuance of one or more tickets may be facilitated by the merchant server 116 associated with the ABC railways.

At 555, the merchant server 116 after receiving the transaction details and the product requirement from the acquirer server 108 is configured to send the products associated with the product requirements to the user device 104 directly over the secure RF connection 118 which is explained in detail in FIG. 4. The merchant server 116 also sends the product associated with the product requirements to the acquirer server 108.

At 560, the acquirer server 108 forwards the transaction details and the products received from the merchant server 116 to the payment network server 106. The details and the products together make confirmation message. This is called the first confirmation message which will be sent to the user 102.

At 565, the payment network server 106 is further configured to send the notification signal to the issuer server 112 wherein the notification signal includes the details received from the acquirer server 108. The transaction details may include Txn number, confirmation ID etc., and the products may be the products selected by the user 102 on the payment network application.

At 570, the issuer server 112 is configured to send the transaction details and the one or more products to the user device 104. This notification is a confirmation message to the user regarding the successful completion of the payment transaction and it also includes the one or more products selected by the user for purchase. This message is called a first confirmation message throughout the specification. The user may receive the same message, which is called the second confirmation message, directly from the merchant server 116 over the secure RF connection 118 established between the user device 104 and the merchant server 116 (Refer FIG. 4).

Figure 6:
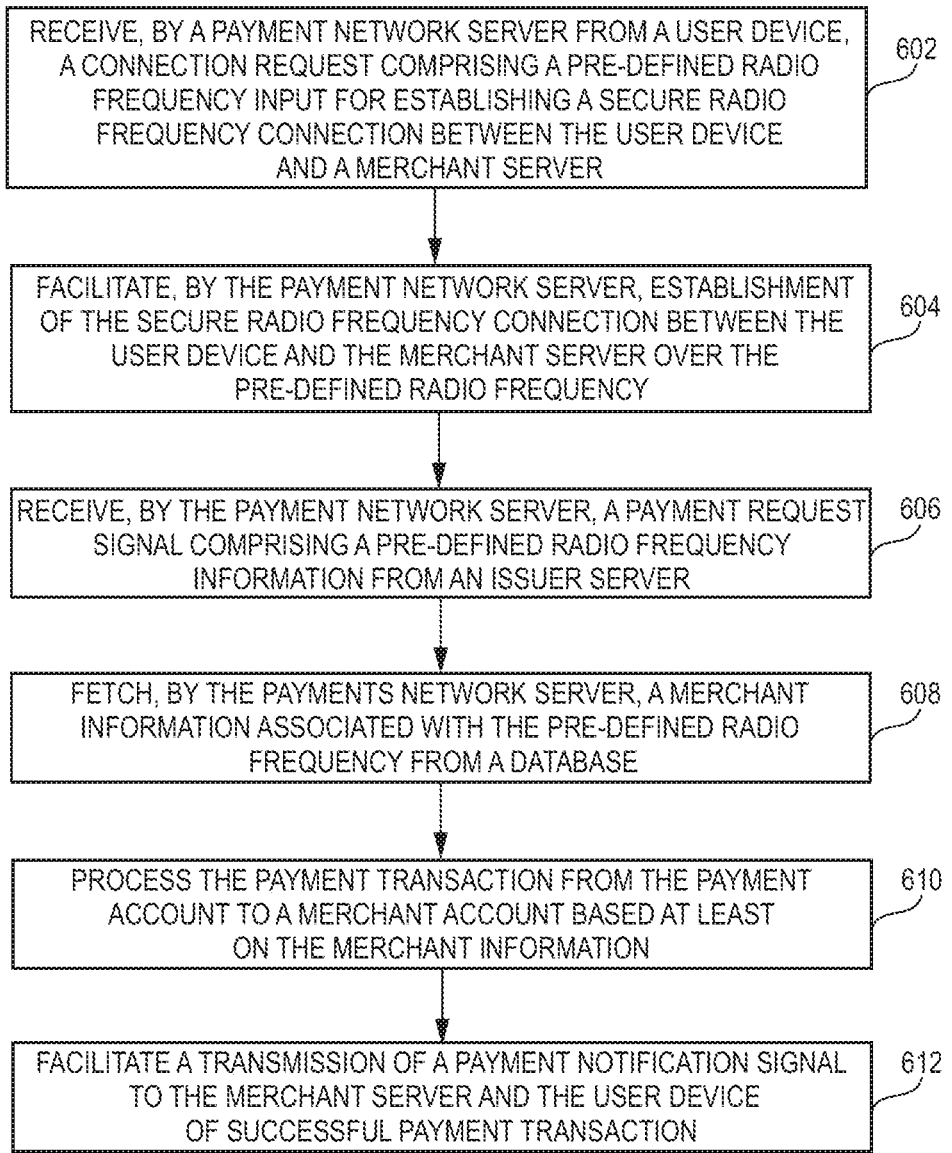
FIG. 6 illustrates a flow diagram of a method for facilitating a payment transaction by a payment network server, in accordance with an example embodiment.

Now referring to FIG. 6, a flow diagram of a method 600 for facilitating a payment transaction from a user device 104 is shown, in accordance with an example embodiment. The method 600 depicted in the flow diagram may be executed by, for example, a server system such as, the payment network server 106. Operations of the method 600, and their combinations may be implemented by, for example, hardware, firmware, a processor, circuitry and/or a different device associated with the execution of software that includes one or more computer program instructions. The method 600 starts at operation 602.

At 602, the method 600 includes receiving, by a payment network server 106, from a user device 104, a connection request including a pre-defined radio frequency input for establishing a secure radio frequency connection 118 between the user device 104 and the merchant server 116 of a merchant 114. The user 102 may utilize an application provided by the payment network server 106 to input the pre-defined radio frequency associated with the merchant 114. The application is provided by the payment network server 106 present in the payment network 110. The payment network server 106 may include a memory 128 to store a list of merchants with their corresponding pre-defined radio frequencies. The payment network server 106 may map the pre-defined radio frequency input by the user 102 and may initiate an establishment of the secure RF connection 118.

At 604, the method 600 includes facilitating, by the payment network server 106, establishment of the secure radio frequency connection 118 between the user device 104 and the merchant server 116 over the pre-defined radio frequency. After the payment network server 106 has mapped the merchant associated with the pre-defined radio frequency, the payment network server 106 facilitates an establishment of a secure radio frequency connection 118 between the user device 104 and the merchant server 116. The secure connection over the radio frequency is rendered by the radio communication component 124 which may be, but not limited to a city-wide antenna or a satellite. The secure connection is encrypted, and the user device may establish a 3-way/4-way handshake with the merchant server 116 in order to maintain a secure tunnel between the two server systems. Features such as session timeout and idle timeout may be implemented on this established tunnel for enhanced security.

At 606, the method 600 includes receiving, by the payment network server 106, a payment request signal including a pre-defined radio frequency information from an issuer server 112 associated with an issuer of a payment account of the user 102 of the user device 104. The user 102, after the establishment of secure RF connection, may select one or more products for purchasing and may choose to make a payment to the merchant 114 using the same application on the user device 104. The user 102 may further choose a payment method and initiate the payment from the application. The payment transaction request will be directed to the issuer server 112 associated with the issuer bank of the user 102's payment account. The issuer server may further request the user 102 for perform authentication and after the completion of the authentication, the issuer server 112 may authorize the payment transaction and forward the payment transaction to the payment network server 106. The payment transaction may not include the acquirer details as the user 102 has only specified the predefined radio frequency, hence the transaction is forwarded to the payment network sever 106 along with the pre-defined radio frequency of the merchant.

At 608, the method 600 includes fetching, by the payment network server 106, a merchant information associated with the pre-defined radio frequency from a database 148 associated with the agency server 120. The agency server 120 may be maintained by an agency designated to allocate pre-defined radio frequencies to the merchants (for e.g., government agency). The database 148 may include all the information related to merchants registered under the agency. The information may include the account details and other personal information of the merchants. The payment network server 106 is configured to fetch the information related to the merchant 114 associated with the pre-defined radio frequency sent by the issuer server 112. The acquirer of the merchant bank may be mapped based on the fetched information. Furthermore, after the mapping of the acquirer, the payment network server 106 may process the payment transaction which is discussed in the next step.

At 610, the method 600 includes processing the payment transaction from the payment account of the user 102 to a merchant account of the merchant 114 based at least on the merchant information fetched from the database 148 of the agency. The payment network server 106 may process the payment transaction and forward the details to the acquirer server 108 of the acquirer associated with the merchant account. The payment network server 106 may forward transaction details and product requirements to the acquirer server 108. The product requirements may include one or more products selected by the user 102 on the payment network application. The acquirer server 108 may then forward the same to the merchant server 116. The merchant server 116 may in turn send back the transaction details and the products associated with the product requirement to the acquirer server 108. The acquirer server 108 may further send the same to the payment network server 106.

At 612, the method 600 includes facilitating a transmission of a payment notification signal to the merchant server 116 and the user device 104 of successful payment transaction from the payment account of the user 102 to the merchant account of the merchant 114. The payment network server 106 after receiving the transaction details and the one or more products associated with the product requirement, may transmit a confirmation message to the issuer server 112 about the successful payment and the one or more products associated with the product requirement. The issuer server 112 may further send the same to the user device 104. This notification may be called as a first confirmation message as there is another message similar to this including the transaction details and one or more products associated with the product requirement directly to the user device 104 from the merchant server 116 over the secure RF connection 118. This notification is called second confirmation message.

FIGS. 7A-7D, collectively, represent example representations of the payment network application installed on the user device 104 and being used to make a payment to the merchant 114 with corresponding User Interfaces (UIs), in accordance with an example embodiment.

Figure 7A:
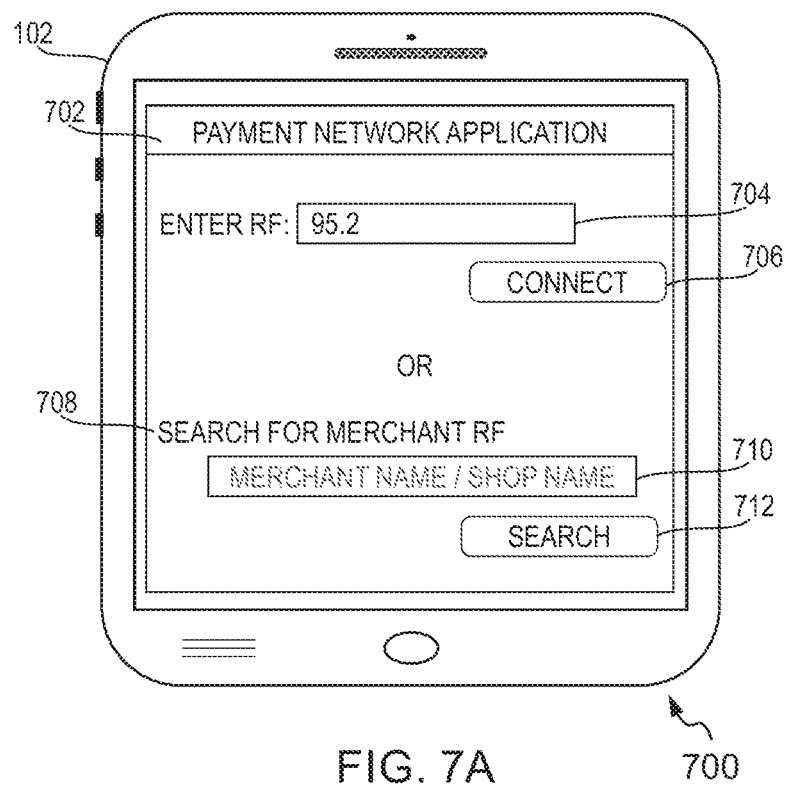
FIGS. 7A, 7B, 7C, and 7D, collectively, represent an example representation of inputting a pre-defined radio frequency and initiating a payment with corresponding User Interfaces (UIs), in accordance with an example embodiment.

FIG. 7A illustrates an UI representation 700 of the payment network application with a header 'Payment network application' 702. The application enables the user 102 to input a pre-defined radio frequency or search for a merchant's pre-defined radio frequency using one of a merchant name, a shop name, and the like. Another heading 'Enter RF' is shown in the figure with a text box 704. This text box 704 facilitates the user 102 to enter a pre-defined radio frequency of a merchant to whom the user 102 wishes to make a payment transaction. It is exemplarily shown in the FIG. 7A that the user has entered a pre-defined radio frequency "95.2". The user may further click a button 706 which says 'connect'. This button 706 facilitates the connection request to be sent to the payment network server 106. Further, the payment network server 106 may establish the secure RF connection 118 between the user device 104 and the merchant server 116.

Furthermore, in FIG. 7A, a field 708 displays 'Search for Merchant RF' followed by a text box 710 which has a pretext written which reads 'Merchant/Shop name'. A search button 712 is also provided for the user 102 when the user 102 is not aware of the merchant's pre-defined radio frequency. As the field 708 depicts, the user 102 may utilize this option to search for a merchant's pre-defined radio frequency in order to establish a secure connection with the merchant over the radio frequency. The user 102 may enter the merchant name or the shop name in the text box 710 and press on the search button 712. The payment network application is configured to search for the pre-defined radio frequency associated with the merchant name or the shop name entered by the user 102 inside the text box 710.

In an example embodiment, if the user 102 wants to buy a railway platform ticket from 'ABC railways', but the user 102 does not know the pre-defined radio frequency of the merchant ABC Railways, the user 102 may perform a name search by entering the name 'ABC Railways' in the text box 710 and press the search button 712. The payment network application may search for the pre-defined radio frequency associated with the merchant and display the pre-defined radio frequency to the user 102. In the example, the payment network application may display '95.2 MHz' as the pre-defined radio frequency associated with the merchant i.e., ABC Railways. This facilitates the user 102 to search for the pre-defined radio of any merchant and establish a secure RF connection when the user 102 is unaware of the same.

Figure 7B:
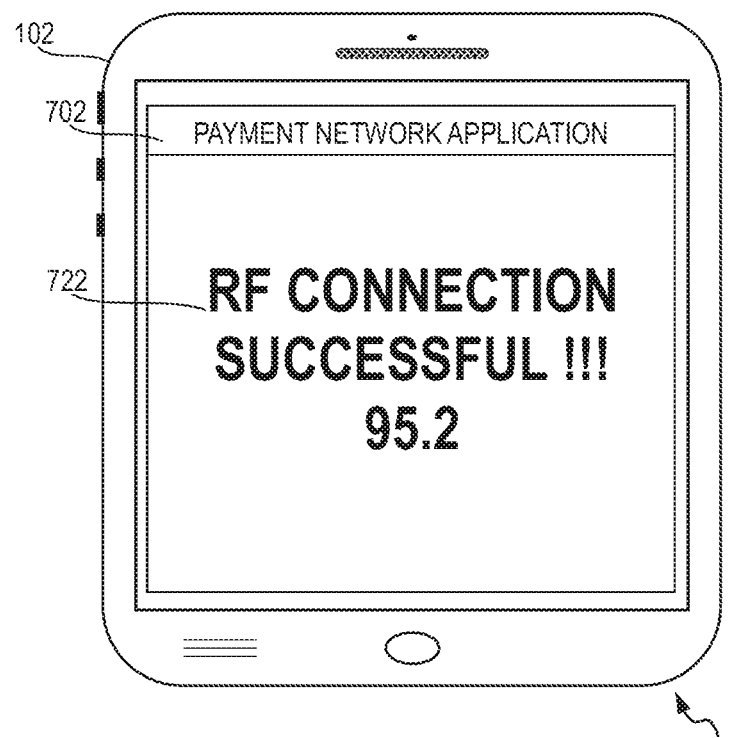

Now turning to FIG. 7B, a UI representation 720 of the successful connection message sent by the merchant server 116 to user device 104 after the establishment of a secure RF connection 118, is exemplarily shown. The field reads 'Payment network application', which depicts the name of the application. The UI representation 720 is exemplarily shown displaying a successful connection message 722 which says, 'RF connection successful with 95.2 !!!'. The message is shown exemplarily, and it may differ as per the application configurations.

Figure 7C:
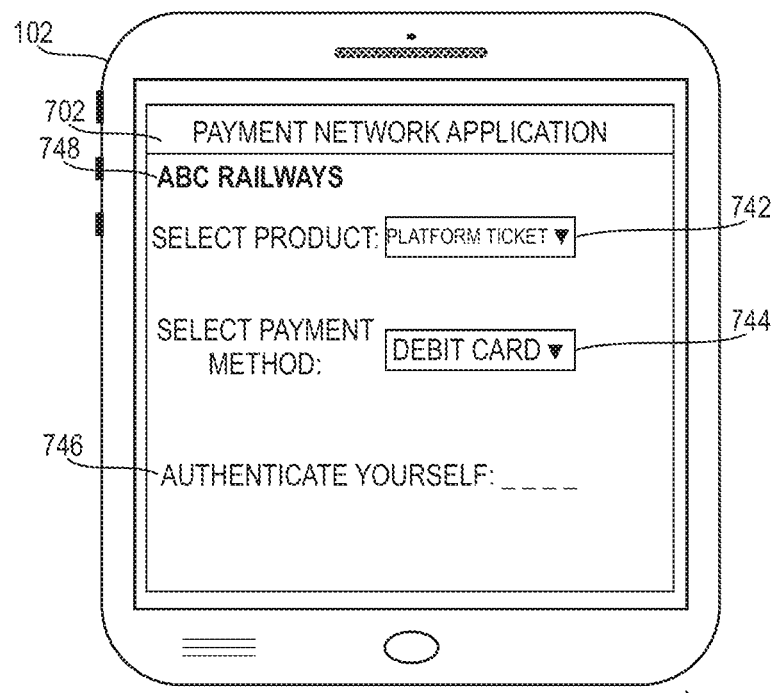

FIG. 7C depicts another UI representation 740 exemplarily showing a product selection section 742, a payment method selection section 744, and an authentication section 746. The product selection section 742 facilitates the user to select one or more products that the merchant is providing. This may be a dropdown menu or a checkbox menu or an add to cart type menu. In the UI representation 740, it is exemplarily shown that the merchant is ABC Railways depicted by the heading 748 and the user has selected to buy a platform ticket depicted by a dropdown menu. After the user has chosen the product or products that he/she has to buy, the user may proceed to make a payment.

It is exemplarily shown that the payment method selection section 744 and the authentication section 746 are in the same page. However, the product selection, payment mode selection and the authentication section maybe displayed in different individual pages step by step, one after the other. The payment method selection section 744 may include a dropdown menu which facilitates the user to select at least one payment mode that the user wants to make payment from. The dropdown menu may have a plurality of options such as but not limited to debit card, credit card, UPI, and Wallet. It is exemplarily shown that the user has selected debit card from the dropdown menu to make the payment for the selected product.

After the user has selected the payment method, a payment transaction request is sent to an issuer server associated with the issuing bank associated with the user's payment account. The issuer may check the payment details and request the user for authenticating the identity of the user. The user has to authenticate his/her identity based on any of the authentication method defined by the issuer. The authentication method may be one of but not limited to a biometric authentication, an OTP authentication, and PIN code authentication. It is exemplarily shown in the FIG. 7C that the user has to authenticate his/her identity by entering a PIN code. The UI representation 740 is shown having an authentication section 746 with text box to enter PIN code. The user may authenticate his/her identity and the payment transaction may be further authorized by the issuer server and sent to payment network server for further processing.

The payment network may process the payment and forward the payment transaction details and product requirements to the acquirer server of the acquirer bank associated with the merchant account. The acquirer server 108 may further forward the same to the merchant server. In the embodiment, the merchant server 116 may send the transaction details and the products associated with the product requirement to the user device 104 over the secure RF connection which is established. The message is directly sent to the user device 104 from the merchant server 116 over secure and encrypted radio frequency connection.

In an alternate embodiment, the user 102 may be at a physical establishment of the merchant (e.g., Brick and mortar store). The user 102 may pick up the products required from the store and make a payment to the merchant using the application on the user device 104. In this scenario, the user 102 does not have to choose the products in the product selection section of the UI representation 760. The user application is configured to display the payment page directly to make the payment transaction. The user 102 inputs the pre-defined radio frequency associated with the merchant before making the payment in order to establish a secure RF connection. After the establishment, the user 102 may complete the payment in the same way as discussed above. This enables the user 102 to make a payment from anywhere in the store as the range of a radio frequency connection is vast. This obviates the need to stand in a long queue or wait for the merchant or a store personnel to bill and collect the payment.

Figure 7D:
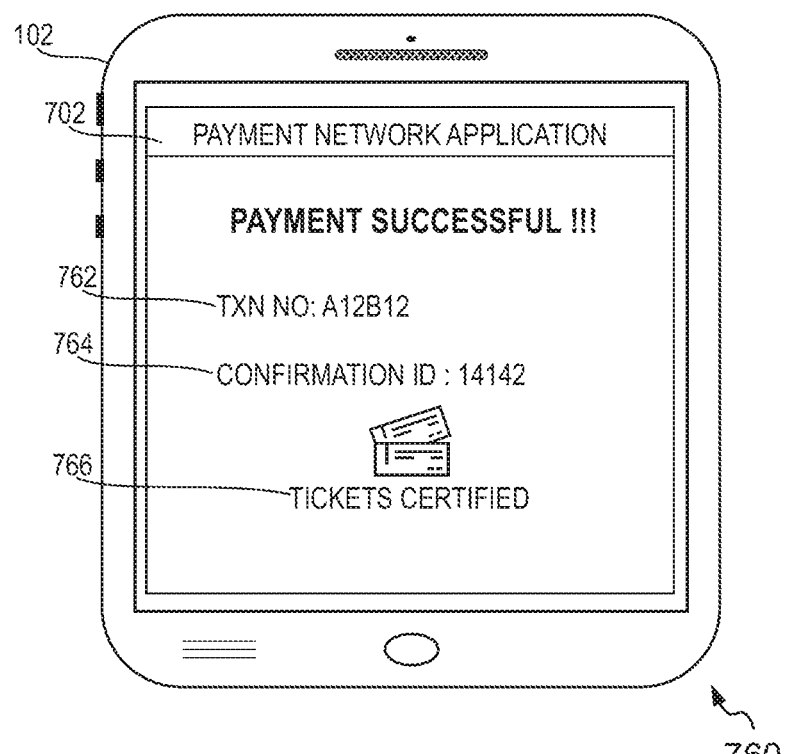

Referring now to FIG. 7D, a UI representation 760 is a page displaying a confirmation message for the corresponding purchase and payment made by the user. 102 The UI representation 760 is exemplarily shown to display the heading 702 saying 'Payment network application' which depicts the name of the application. Further the UI representation 760 has a plurality of transaction details such as Txn ID 762, Confirmation ID 764 and a product 766 related to the product requirement sent by the acquirer to the merchant server. It is exemplarily shown in the UI representation 760 that the Txn ID 762 is 'A12B12' and the Confirmation ID 764 is '14142'. As previously discussed in the example embodiment, the product chosen by the user was a platform ticket depicted by the dropdown menu. This confirmation message is received by the user device directly from the merchant server over the secure RF connection.

Figure 8:
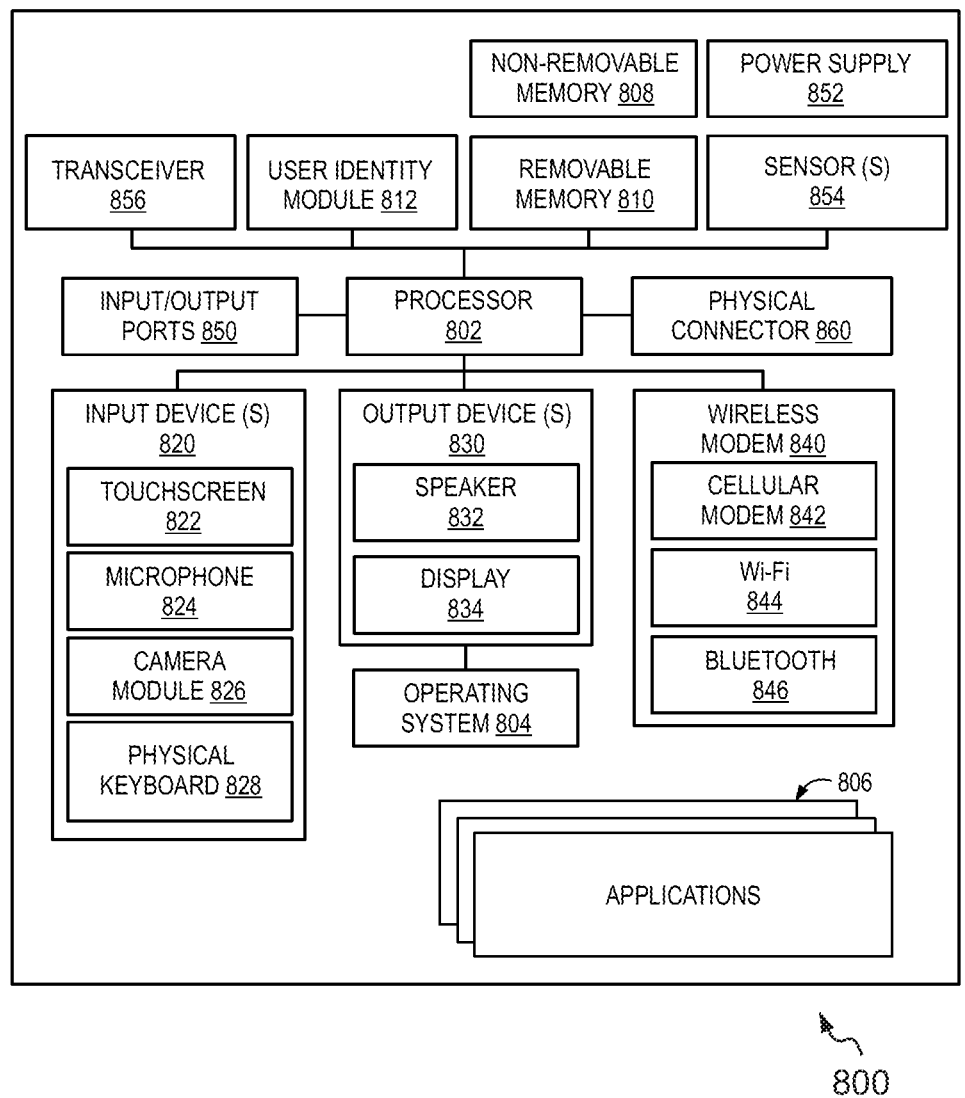
FIG. 8 is a simplified block diagram of a remote device, in accordance with one embodiment of the present disclosure.

FIG. 8 is a simplified block diagram of a user device 800 for example a mobile phone or a desktop computer capable of implementing the various embodiments of the present disclosure. For example, the user device 800 may correspond to the user device 104 of FIG. 1 or a merchant device. The user device 104 is shown to include a component named payment network application engine 134a. The payment network application engine 134a may facilitate the user 102 to use the application provided by the payment network server 106. The application facilitates the user to input a pre-defined radio frequency and establish a secure RF connection with the merchant server 116 of the merchant associated with the pre-defined radio frequency. The application further facilitates the user 102 to make payment to the merchant through the user device 104.

It should be understood that the user device 800 as illustrated and hereinafter described is merely illustrative of one type of device and should not be taken to limit the scope of the embodiments. As such, it should be appreciated that at least some of the components described below in connection with the user device 800 may be optional and thus in an example embodiment may include more, less, or different components than those described in connection with the example embodiment of the FIG. 8. As such, among other examples, the user device 800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the user device 800 and supports for one or more payment transaction applications programs (see, the applications 806) such as the payment gateway application, that implements one or more of the innovative features described herein. In addition, to the payment gateway application, the applications 806 may include common mobile computing applications (e.g., telephony applications, email applications, calendars, contact managers, web browsers, messaging applications) or any other computing application.

The illustrated user device 800 includes one or more memory components, for example, a non-removable memory 808 and/or removable memory 810. The non-removable memory 808 and/or the removable memory 810 may be collectively known as a database in an embodiment. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The user device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to, a speaker 832 and a display 834. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the user device 800 and a public switched telephone network (PSTN).

The user device 800 can further include one or more input/output ports 850, a power supply 852, one or more sensors 854 for example, an accelerometer, a gyroscope, a compass, or an infrared proximity sensor for detecting the orientation or motion of the user device 800 and biometric sensors for scanning biometric identity of an authorized user, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the method 600 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the payment network server 106, the agency server 120, issuer server 112 and acquirer server 108 and their various components such as the processor 126, memory 128 and the like may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semi-conductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present disclosure offer multiple advantages and technical effects. For instance, the present disclosure facilitates a user to make a payment to a merchant from within the vicinity of a radio frequency connection which in general has a large range area. The users do not have to stand in long queues and wait for their products to be billed and pay at the Point of Sale terminal (POS). In some embodiments, the users can select one or more products on the application or alternately, they may visit the store and pick up products required by them and make the payment for the corresponding purchase from a user device from anywhere inside the vicinity of radio connection. The radio connection is an isolated connection and is made highly secure so that the data flowing between the end points of the connection is not exposed for hackers and fraudsters. The secure tunnel created between the user device and merchant server facilitates highly secure and isolated data communication, and a larger range of connectivity for the user device.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed:

1. A payment transaction method, comprising:
   receiving, by a payment network server from a user device, a connection request comprising a pre-defined radio frequency, wherein the payment network server stores a list of a plurality of merchants each allocated a corresponding pre-defined radio frequency from a plurality of pre-defined radio frequencies;
   upon receiving the connection request, mapping, by the payment network server, a merchant server with the pre-defined radio frequency based on the stored list;
   establishing, by the payment network server, a secure radio frequency connection between the user device and the merchant server over the pre-defined radio frequency via a radio communication component corresponding to the pre-defined frequency;
   receiving, by the payment network server, a payment request signal comprising the pre-defined radio frequency and an authorization of a payment transaction from an issuer server associated with an issuer of a payment account of a user of the user device;
   fetching, by the payments network server, merchant information associated with the pre-defined radio frequency from a database storing information related to the plurality of merchants and a plurality of merchant accounts linked to the plurality of pre-defined radio frequencies allocated to the plurality of merchants;
   processing the payment transaction from the payment account to a merchant account based at least on the merchant information; and
   transmitting a payment notification signal to the merchant server and the user device of a successful payment transaction from the payment account of the user to the merchant account.

2. The method as claimed in claim 1, further comprising:
   providing, by the payment network server, an application on the user device configured to facilitate the user to input the pre-defined radio frequency and initiate the payment transaction from the user device.

3. The method as claimed in claim 2, wherein the application is further configured to:
   facilitate the user of the user device to search for the merchant using a name search of the merchant if the user is unaware of the pre-defined radio frequency; and
   display, on a display of the user device, the pre-defined radio frequency associated with the merchant based on the search.

4. The method as claimed in claim 1, wherein prior to fetching the merchant information associated with the pre-defined radio frequency from the database, the payment network server is configured to transmit a request signal to an agency server associated with an agency maintaining the database, the request signal including a request to link the merchant account with the pre-defined radio frequency in the database.

5. The method as claimed in claim 4, wherein the agency is configured to register the merchant and allocate the pre-defined radio frequency for the merchant based on the request in the request signal.

6. The method as claimed in claim 1, further comprising mapping, using the merchant information, the payment transaction to an acquirer of the merchant account, wherein processing the payment transaction comprises transmitting transaction details and product requirement to an acquirer server associated with the acquirer of the merchant account.

7. The method as claimed in claim 6, further comprising:
   transmitting, by the acquirer server to the merchant server, the transaction details, and the product requirement; and
   receiving, by the acquirer server from the merchant server, a first confirmation message.

8. The method as claimed in claim 7, wherein the first confirmation message comprises an information of a product associated with the payment transaction.

9. The method as claimed in claim 1, wherein transmitting the payment notification signal comprises receiving a first confirmation message from an acquirer server associated with an acquirer of the merchant account and sending the first confirmation message to the issuer server.

10. The method as claimed in claim 9, wherein the issuer server is configured to transmit the first confirmation message to the user device.

11. The method as claimed in claim 10, further comprising:
    transmitting, by the merchant server to the user device, a second confirmation message over the secure radio frequency connection after completion of the payment transaction.

12. A payment network server, comprising:
    a communication interface configured to communicate with an issuer server, an acquirer server, and a user device via one or more networks;

a memory configured to store instructions, the memory further storing a list of a plurality of merchants each allocated a corresponding pre-defined radio frequency;
a radio communication component configured to communicate with the user device and the plurality of merchants over the corresponding pre-defined frequency; and
a processor configured to execute the instructions stored in the memory and thereby cause the payment network server to perform at least in part to:
receive, from the user device a connection request comprising a pre-defined radio frequency,
upon receiving the connection request, map a merchant server with the pre-defined radio frequency based on the list stored in the memory,
establish a secure radio frequency connection between the user device and the merchant server over the pre-defined radio frequency,
receive a payment request signal comprising the pre-defined radio frequency and an authorization of a payment transaction from the issuer server associated with an issuer of a payment account of a user of the user device,
fetch a merchant information associated with the pre-defined radio frequency from a database storing information related to the plurality of merchants and a plurality of merchant accounts linked to a plurality of pre-defined radio frequencies allocated to the plurality of merchants,
process the payment transaction from the payment account to a merchant account based at least on the merchant information, and
transmit a payment notification signal to the merchant server and the user device of a successful payment transaction from the payment account of the user to the merchant account.

13. The payment network server as claimed in claim 12, wherein the payment network server is further caused to:
provide an application on the user device configured to facilitate the user to input the pre-defined radio frequency and initiate the payment transaction from the user device.

14. The payment network server as claimed in claim 13, wherein the application is further configured to facilitate the user of the user device to search for the merchant using a name search of the merchant if the user is unaware of the pre-defined radio frequency.

15. The payment network server as claimed in claim 12, wherein prior to fetching the merchant information from the database, the payment network server is caused to transmit a request signal to an agency server associated with an agency maintaining the database.

16. The payment network server as claimed in claim 12, wherein for processing the payment transaction, the payment network server is further caused to transmit transaction details and product requirement to the acquirer server of the merchant account.

17. The payment network server as claimed in claim 12, wherein the payment network server is further caused to:
transmit the payment notification signal by receiving a first confirmation message from the acquirer server associated with an acquirer of the merchant account and sending the first confirmation message to the issuer server.

18. One or more non-transitory computer readable storage media having computer-executable instructions fora payment transaction that, upon execution by a processor, cause the processor to at least:
receive, by a payment network server from a user device, a connection request comprising a pre-defined radio frequency, wherein the payment network server stores a list of a plurality of merchants each allocated a corresponding pre-defined radio frequency;
upon receiving the connection request, map the pre-defined radio frequency to a merchant server based on the stored list;
establish, by the payment network server, a secure radio frequency connection between the user device and the merchant server over the pre-defined radio frequency via a radio communication component corresponding to the pre-defined radio frequency;
receive, by the payment network server, a payment request signal comprising the pre-defined radio frequency and an authorization of a payment transaction from an issuer server associated with an issuer of a payment account of a user of the user device;
fetch, by the payments network server, a merchant information associated with the pre-defined radio frequency from a database storing information related to the plurality of merchants and a plurality of merchant accounts linked to a plurality of pre-defined radio frequencies allocated to the plurality of merchants;
process the payment transaction from the payment account to a merchant account based at least on the merchant information; and
transmit a payment notification signal to the merchant server and the user device of a successful payment transaction from the payment account of the user to the merchant account.

19. The one or more non-transitory computer readable storage media of claim 18, wherein the pre-defined radio frequency is isolated from the internet and any other form of communication.

20. The one or more non-transitory computer readable storage media of claim 18, wherein any data communication made on the pre-defined radio frequency is encrypted.

* * * * *